US011525051B2

(12) United States Patent
Sun et al.

(10) Patent No.: US 11,525,051 B2
(45) Date of Patent: Dec. 13, 2022

(54) MULTI-VINYL CYCLIC SILOXANE ENHANCED ETHYLENE/α-OLEFIN/DIENE INTERPOLYMER BASED COMPOSITIONS

(71) Applicant: Dow Global Technologies LLC, Midland, MI (US)

(72) Inventors: Yabin Sun, Shanghai (CN); Bo Lyu, Shanghai (CN); Hongyu Chen, Shanghai (CN); Tao Han, Shanghai (CN); Jianfeng Huang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 69 days.

(21) Appl. No.: 17/052,732

(22) PCT Filed: Jun. 4, 2018

(86) PCT No.: PCT/CN2018/089757
§ 371 (c)(1),
(2) Date: Nov. 3, 2020

(87) PCT Pub. No.: WO2019/232668
PCT Pub. Date: Dec. 12, 2019

(65) Prior Publication Data
US 2021/0230426 A1 Jul. 29, 2021

(51) Int. Cl.
*C08L 23/16* (2006.01)
*C08K 5/14* (2006.01)
(Continued)

(52) U.S. Cl.
CPC .......... *C08L 23/16* (2013.01); *C08K 5/14* (2013.01); *C08K 5/5403* (2013.01); *C08K 5/549* (2013.01); *C08K 5/5425* (2013.01); *C08K 5/5435* (2013.01)

(58) Field of Classification Search
None
See application file for complete search history.

(56) References Cited

U.S. PATENT DOCUMENTS 3,859,247 A 1/1975 MacKenzie, Jr.
3,946,099 A 3/1976 MacKenzie, Jr.
(Continued)

FOREIGN PATENT DOCUMENTS

CN 103304902 A 9/2013
CN 104277182 A 1/2015
(Continued)

OTHER PUBLICATIONS

PCT/CN2018/089757, International Search Report and Written Opinion dated Feb. 22, 2019.
(Continued)

*Primary Examiner* — Richard A Huhn
(74) *Attorney, Agent, or Firm* — Cheney Huang

(57) ABSTRACT

A composition comprising the following components: A) an ethylene/α-olefin/non-conjugated diene interpolymer; B) a peroxide; C) at least one multi-vinyl cyclic siloxane selected from Structure 1 below: Structure 1, wherein n is an integer greater than, or equal to, 1; and each R1 is independently selected from the following: a ($C_2$-$C_4$) alkenyl, or a $H_2C{=}C(R^{1a})$—$C({=}O)$—$O$—$(CH_2)_m$—, and wherein $R^{1a}$ is H or methyl, and m is an integer from 1 to 4; and each R2 is independently selected from the following: H, a ($C_1$-$C_4$) alkyl, a ($C_2$-$C_4$) alkenyl, a phenyl, or a $H_2C{=}C(R^{1b})$—$C({=}O)$—$O$—$(CH_2)_m$—, wherein $R^{1b}$ is H or methyl, and m is an integer from 1 to 4.
(Continued)

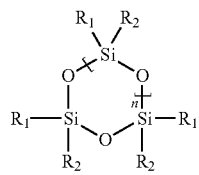

15 Claims, 4 Drawing Sheets

(51) Int. Cl.
*C08K 5/54* (2006.01)
*C08K 5/5435* (2006.01)
*C08K 5/5425* (2006.01)
*C08K 5/549* (2006.01)

(56) References Cited

U.S. PATENT DOCUMENTS

| | | | |
|---|---|---|---|
| 4,005,254 | A | 1/1977 | MacKenzie, Jr. |
| 4,201,698 | A | 5/1980 | Itoh et al. |
| 4,499,210 | A * | 2/1985 | Senuma ............ C08F 255/00 521/154 |
| 5,597,867 | A | 1/1997 | Tsujimoto et al. |
| 6,413,201 | B1 | 7/2002 | Ikemoto et al. |
| 11,261,272 | B2 * | 3/2022 | Zhang ............ C08F 110/02 |
| 2008/0315148 | A1 | 12/2008 | Adler et al. |
| 2012/0157624 | A1 | 6/2012 | Saito |
| 2015/0203648 | A1 * | 7/2015 | Yahara ............ C08J 9/141 521/150 |
| 2020/0199309 | A1 | 6/2020 | Yang et al. |
| 2020/0199340 | A1 | 6/2020 | Sun et al. |
| 2022/0009337 | A1 | 1/2022 | Chae et al. |

FOREIGN PATENT DOCUMENTS

| | | |
|---|---|---|
| CN | 105670135 A | 6/2016 |
| CN | 105860284 A | 8/2016 |
| CN | 108102232 A | 6/2018 |
| DE | 2001205 A1 | 7/1970 |
| EP | 278157 A2 | 8/1988 |
| EP | 1065241 A2 | 1/2001 |
| JP | 2002030185 A | 1/2002 |
| JP | 2007204644 A | 8/2007 |
| JP | 4603635 B2 | 12/2010 |
| WO | 2019000744 A1 | 1/2019 |

OTHER PUBLICATIONS

PCT/CN2018/089757, International Preliminary Report on Patentability with a issuance dated Dec. 8, 2020.

* cited by examiner

MULTI-VINYL CYCLIC SILOXANE ENHANCED ETHYLENE/α-OLEFIN/DIENE INTERPOLYMER BASED COMPOSITIONS

BACKGROUND

EPDM-based polymer compositions are used in automotive and infrastructures applications. One target application is for hose for automotive Under-the-Hood (UTH) applications, where higher heat resistance is required (from 120/135° C. to 150° C. for 1008 hours), due to the increased UTH temperatures, especially for turbo-charged engines. Another important application of such EPDM compositions is the manufacture of thermoplastic dynamic vulcanizates (TPVs). A TPV is a thermoplastic elastomer that contains a thermoplastic continuous phase and a fine elastomeric dispersed phase, which is cured during the mixing (dynamic vulcanization) process. Due to its superior elastomeric characteristic, low density, easy processibility, and recycling capability, TPVs have become the material of choice for automotive parts, such as body sealing profiles and many other products.

EPDM compositions can be cured by sulfur and peroxide. Compared with sulfur cured EPDM, peroxide cured EPDM compounds have a better heat aging resistance. In organic peroxide curing formulation, multifunctional coagents are also used to modify the cure kinetics and ultimate physical properties. Some coagents, such as multifunctional acrylates or maleimides with polar bridging groups, have poor solubility in EPDM. These coagents produce phase-separated domains of high local concentrations. As the peroxides used are also polar in nature, it is likely that a disproportionate amount of the radicals formed, are partitioned in the coagent domains, as well, promoting thermoset "filler-like" particles produced from radical addition reactions. Such a crosslink network may generate inhomogeneous thermal degradation, in the compositions and final articles, during heat aging. Thus, there is a need for new EPDM-based compositions that contain coagents that have better solubility in EPDM, and good resistance.

Silicone rubber has higher thermal stability than EPDM. Blending silicone rubber in EPDM is a way to improve the heat resistance of EPDM. However EPDM and silicone are two immiscible materials. Simply physical blending EPDM and silicone will get coarse phase morphology and inferior properties. Elastomer compositions are described in the following references: U.S. Pat. Nos. 4,005,254, 4,201,698, 3,859,247, and 3,946,099. However, as discussed above, there remains a need for new EPDM-based compositions that form a homogeneous dispersion of coagent and other additives, and have good thermal resistance. This need has been met by the following invention.

SUMMARY

A composition comprising the following components:

A) an ethylene/α-olefin/non-conjugated diene interpolymer;

B) a peroxide;

C) at least one multi-vinyl cyclic siloxane selected from Structure 1 below:

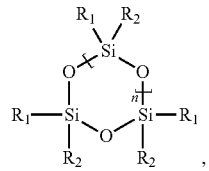

Structure 1 wherein n is an integer greater than, or equal to, 1; and each R1 is independently selected from the following: a $(C_2\text{-}C_4)$alkenyl, or a $H_2C{=}C(R^{1a})\text{—}C({=}O)\text{—}O\text{—}(CH_2)_m\text{—}$, and wherein $R^{1a}$ is H or methyl, and m is an integer from 1 to 4; and each R2 is independently selected from the following: H, a $(C_1\text{-}C_4)$alkyl, a $(C_2\text{-}C_4)$alkenyl, a phenyl, or a $H_2C{=}C(R^{1b})\text{—}C({=}O)\text{—}O\text{—}(CH_2)_m\text{—}$, wherein $R^{1b}$ is H or methyl, and m is an integer from 1 to 4.

BRIEF DESCRIPTION OF THE DRAWINGS

FIG. 1 depicts the Tensile Strength of example 1-3 and comparative example 1-3.

FIG. 2 depicts the Elongation at Break of example 1-3 and comparative example 1-3.

FIG. 3 depicts the retention % of Elongation at Break of example 1-3 and comparative example 1-3.

FIG. 4 depicts the Tensile Strength of example 4 and comparative example 4-6.

FIG. 5 depicts the Elongation at Break of example 4 and comparative example 4.

FIG. 6 depicts the retention % of Elongation at Break of example 4 and comparative example 4-6.

FIG. 7 depicts the Tensile Strength of example 5-6 and comparative example 7-9.

FIG. 8 depicts the Elongation at Break of example 5-6 and comparative example 7-9.

FIG. 9 depicts the retention % of Elongation at Break of example 5-6 and comparative example 7-9.

DETAILED DESCRIPTION

Figure 1:
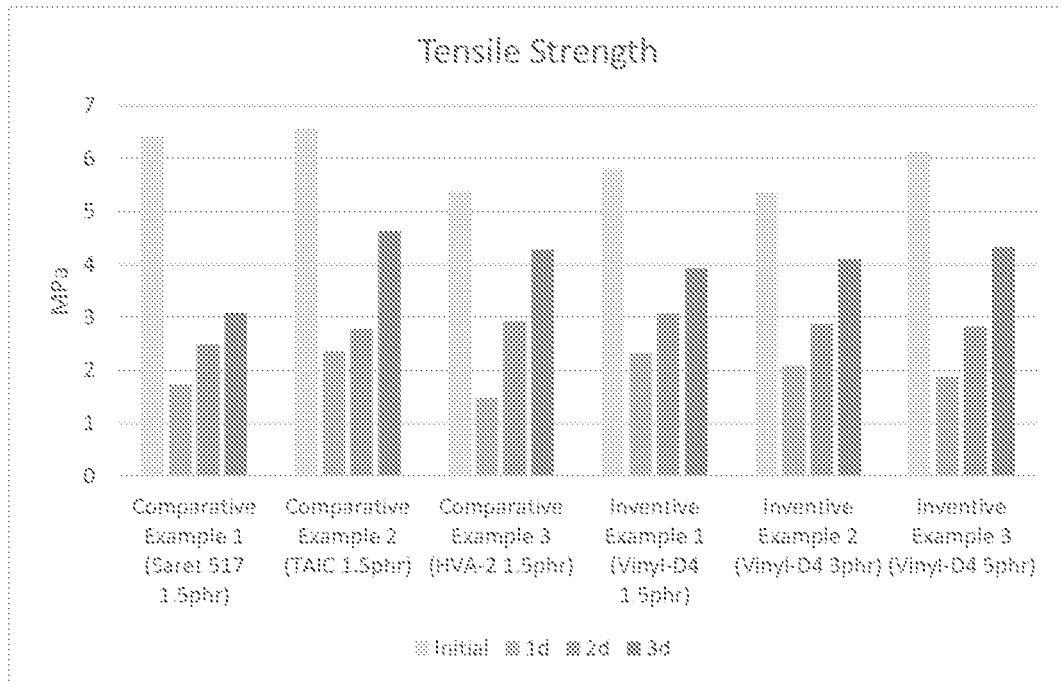
FIGS. 1-9 are bar graphs, each depicting the noted mechanical property (Tensile Strength, Elongation at Break). Before and/or after aging, for comparative and inventive compositions, as follows.

A composition comprising the following components:
A) an ethylene/α-olefin/non-conjugated diene interpolymer;
B) a peroxide;
C) at least one multi-vinyl cyclic siloxane selected from Structure 1 below:

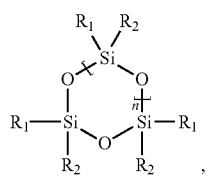

Structure 1 wherein n is an integer greater than, or equal to, 1; and
each R1 is independently selected from the following: a $(C_2-C_4)$alkenyl, or a $H_2C=C(R^{1a})-C(=O)-O-(CH_2)_m-$, and wherein $R^{1a}$ is H or methyl, and m is an integer from 1 to 4; and
each R2 is independently selected from the following: H, a $(C_1-C_4)$alkyl, a $(C_2-C_4)$alkenyl, a phenyl, or a $H_2C=C(R^{1b})-C(=O)-O-(CH_2)_m-$, wherein $R^{1b}$ is H or methyl, and m is an integer from 1 to 4.

It has been discovered that the inventive compositions provide good curing properties, good homogeneity and good thermal properties.

The composition may comprise a combination of two or more embodiments described herein.

Each component of the composition may comprise a combination of two or more embodiments as described herein.

In one embodiment, or a combination of embodiments described herein, the composition further comprises component D selected from a silicone rubber or a silicone oil. A silicone rubber is a solid at room temperature (23° C.) and one atmosphere. A silicone oil is a liquid at room temperature (23° C.), and one atmosphere.

In one embodiment, or a combination of embodiments described herein, the composition further comprises component D is a silicone rubber. In a further embodiment, the silicone rubber is (Methyl Vinyl Silicone Rubber (VMQ) or Methyl Phenyl Vinyl Silicone (PVMQ).

In one embodiment, or a combination of embodiments described herein, the composition further comprises component D is a silicone oil. In a further embodiment, the silicone oil is a vinyl terminated silicone oil.

In one embodiment, or a combination of embodiments described herein, Component D has a weight average molecular weight (Mw)≥100,000 g/mole, or ≥150,000 g/mole, or ≥200,000 g/mole, or ≥250,000 g/mole, or ≥300,000 g/mole, or ≥350,000 g/mole, or ≥400,000 g/mole.

In one embodiment, or a combination of embodiments described herein, Component D has a weight average molecular weight (Mw)≤2,000,000 g/mole, or ≤1,800,000 g/mole, or ≤1,600,000 g/mole, or ≤1,400,000 g/mole, or ≤1,200,000 g/mole, or ≤1,000,000 g/mole, or ≤800,000 g/mole, or ≤600,000 g/mole.

In one embodiment, or a combination of embodiments described herein, Component D comprises structure (a), as shown below:

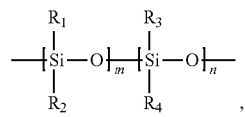

(a)

where m is from 1 to 20000, further from 10 to 2000, further from 20 to 200, and n is from 1 to 20000; R1,
(a) R2, R3 and R4 each, individually, is selected from methyl, phenyl, vinyl, or trifluoropropyl, and where least one of R1, R2, R3 and R4 is vinyl.

In one embodiment, or a combination of embodiments described herein, Component D comprises structure (b), as shown below:

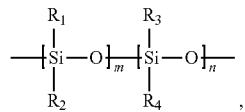

(b)

where m is from 1 to 20000, further from 10 to 2000, further from 20 to 200, and n is from 1 to 20000; R1, R2, R3, R4 each, independently, an alkyl, and R1, R2, R3, R4 may be the same alkyl.

As used herein, in regard to the notation for component D, $R1=R_1$ and $R2=R_2$, and so forth.

In one embodiment, or a combination of embodiments described herein, Component D comprises a structure selected from i), or a structure selected from ii) below:
i) $-O-[Si(R)(CH=CH_2)]-[Si(R')(R'')]-O-$, wherein R, R' and R'' are each, independently, an alkyl group, and further a C1-C6 alkyl group, and wherein R, R' and R'' may all be the same alkyl group;
ii) $H_2C=CH-[Si(R^{IV})(R^V)]-O-$, wherein $R_{IV}$ and $R^V$ are each, independently, an alkyl group, and further a C1-C6 alkyl group, and wherein $R^{IV}$ and $R^V$ may be the same alkyl group. Here, structure i) represents an internal group of a silicone rubber polymer molecule, which internal group is bonded to additional portions of the polymer molecule at each respective oxygen end group. Structure ii) represents an end group of a silicone rubber polymer molecule, which end group is bonded to an additional portion of the polymer molecule at the oxygen end group.

In one embodiment, or a combination of embodiments described herein, Component D comprises pendant vinyl groups and terminal vinyl groups.

In one embodiment, or a combination of embodiments described herein, the Component D is a silicon rubber, which comprises a structure selected from iii):

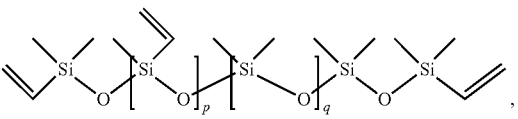

iii)

where p is from 1 to 20, and q is from 2000 to 20000. Here, structure iii) shows an example of pendant vinyl groups, and terminal vinyl groups. In structure iii) above, the pendant vinyl group can be randomly distributed throughout the polymer chain.

In one embodiment, or a combination of embodiments described herein, Component D has a viscosity ≥10⁶ cSt at 25° C.

Component D may comprise a combination of two or more embodiments as described herein.

In one embodiment, or a combination of embodiments described herein, the weight ratio of component A to component D is from 1.1 to 7.0, or from 1.2 to 6.5, or from 1.3 to 6.0, or from 1.4 to 5.5, or from 1.5 to 5.0.

In one embodiment, or a combination of embodiments described herein, the weight ratio of component A to component D is from 1.1 to 5.0, or from 1.2 to 4.5, or from 1.3 to 4.0, or from 1.4 to 3.5, or from 1.5 to 3.0.

In one embodiment, or a combination of embodiments described herein, the weight ratio of component A to component D is from 4.0 to 8.0, or from 4.5 to 7.5, or from 5.0 to 7.0, or from 5.5 to 6.5.

In one embodiment, or a combination of embodiments described herein, for Structure C, n is from 1 to 10, or from 1 to 8, or from 1 to 6, or from 1 to 5, or from 1 to 4, or from 1 to 3, or from 1 to 2. In a further embodiment, n=1.

In one embodiment, or a combination of embodiments described herein, for Structure C, each R2 is independently H or a (C$_1$-C$_4$) alkyl, and further a (C$_1$-C$_4$) alkyl.

In one embodiment, or a combination of embodiments described herein, for Structure C, each R1 is independently a (C$_2$-C$_4$)alkenyl, and further a (C$_2$)alkenyl.

As used herein, in regard to the notation for component C, R1=R$_1$ and R2=R$_2$.

In one embodiment, or a combination of embodiments described herein, the Structure 1 of component C is selected from Structure 1a below:

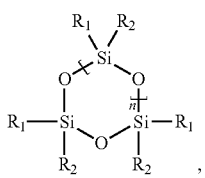

Structure 1a wherein subscript n is an integer greater than or equal to 1; each R1 is independently a (C$_2$-C$_4$) alkenyl, and each R2 is independently H, a (C$_1$-C$_4$) alkyl, a (C$_2$-C$_4$)alkenyl, or a phenyl.

In one embodiment, or a combination of embodiments described herein, Structure 1 is selected from Structure 1b below:

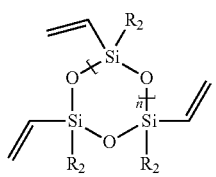

Structure 1b wherein subscript n is an integer greater than, or equal to, 1, and each R2 is independently H, a (C$_1$-C$_4$) alkyl, a (C$_2$-C$_4$) alkenyl, or a phenyl.

In one embodiment, or a combination of embodiments described herein, Structure 1 is selected from Structure 1c below:

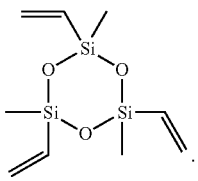

Structure 1c

In one embodiment, or a combination of embodiments described herein, component C is selected from vinyl-D3, vinyl-D4 and vinyl-D5 or a combination thereof.

In one embodiment, or a combination of embodiments described herein, the weight ratio of component A to component C is from 10 to 80, or from 15 to 75, or from 20 to 70.

In one embodiment, or a combination of embodiments described herein, the weight ratio of component A to component C is from 20 to 80, or from 25 to 75, or from 30 to 70.

In one embodiment, or a combination of embodiments described herein, component C is present in an amount from 0.80 wt % to 4.00 wt %, or from 0.80 wt % to 3.80 wt %, or from 0.80 wt % to 3.60 wt %, or from 0.85 wt % to 3.40 wt %, or from 0.85 wt % to 3.20 wt %, or from 0.90 wt % to 3.10 wt % based on the weight of the composition.

In one embodiment, or a combination of embodiments described herein, component A is present in an amount from 36 wt % to 70 wt %, or from 38 wt % to 68 wt %, or from 40 wt % to 66 wt %, or from 42 wt % to 64 wt %, or from 43 wt % to 63 wt % based on the weight of the composition.

In one embodiment, or a combination of embodiments described herein, the ethylene/α-olefin/non-conjugated diene interpolymer of component A is an EPDM.

In one embodiment, or a combination of embodiments described herein, component A has a density from 0.850 to 0.890 g/cc, or from 0.852 to 0.885 g/cc, or from 0.855 to 0.880 g/cc, or from 0.858 to 0.875 g/cc, or from 0.858 to 0.870 g/cc, or from 0.858 to 0.865 g/cc (1 cc=1 cm³).

In one embodiment, or a combination of embodiments described herein, component A has a Mooney Viscosity (ML 1+4, 125° C.) from 20 to 60, or from 25 to 55, or from 30 to 50, or from 35 to 45.

In one embodiment, component A has a melt index (I2) from 0.5 to 5.0 g/10 min, or from 1.0 to 4.0 g/10 min, or from 1.0 to 3.0 g/10 min, or from 1.0 to 2.0 g/10 min (190° C. and 2.16 kg).

In one embodiment, or a combination of embodiments described herein, the composition further comprises component E selected from ZnO and/or MgO, and further ZnO.

In one embodiment, or a combination of embodiments described herein, the weight ratio of component A to component E is from 5.0 to 12, or from 6.0 to 11, or from 7.0 to 10.

In one embodiment, or a combination of embodiments described herein, the composition further comprises component F selected from one or more fillers. In a further embodiment, component F is silica or carbon black.

In one embodiment, or a combination of embodiments described herein, the weight ratio of component A to component F is from 2.4 to 6.2, or from 2.6 to 6.0, or from 2.8 to 5.8.

In one embodiment, or a combination of embodiments described herein, the composition comprises component F in an amount from 5.0 wt % to 60 wt %, or from 10 wt % to 50 wt %, or from 15 wt % to 45 wt %, or from 20 wt % to 40 wt %, or from 25 wt % to 35 wt % based on the weight of the composition.

In one embodiment, or a combination of embodiments described herein, the composition comprises ≥90 wt %, or ≥92 wt %, or ≥94 wt %, or ≥96 wt %, or ≥98 wt %, or ≥99 wt % of component A, based on the weight of all olefin-based polymers present in the composition.

In one embodiment, or a combination of embodiments described herein, the composition comprises ≥80 wt %, or ≥85 wt %, or ≥90 wt %, or ≥95 wt %, or ≥98 wt %, or ≥99 wt % of component A, based on the weight of all polymers present in the composition.

In one embodiment, or a combination of embodiments described herein, component A is the only olefin-based polymer present in the composition.

In one embodiment, or a combination of embodiments described herein, component B is selected from dicumyl peroxide (DCP), or a,a'-bis(tert-butylperoxy)-diisopropyl-benzene (BIBP).

In one embodiment, or a combination of embodiments described herein, the composition comprises component B in an amount from 0.1 wt % to 10 wt %, or from 0.5 wt % to 9.0 wt %, or from 1.0 wt % to 8.0 wt %, based on the weight of the composition.

In one embodiment, or a combination of embodiments described herein, the composition comprises a silane coupling agent, such as, for example, vinyl tris (2-methoxyethoxy) silane (SILQUEST A-172NT). In a further embodiment, the silane coupling agent is present in an amount from 0.1 wt % to 10 wt %, or from 0.5 wt % to 8.0 wt %, or from 1.0 wt % to 6.0 wt %, or from 2.0 wt % to 4.0 wt %, based on the weight of the composition.

In one embodiment, or a combination of embodiments described herein, the composition comprises one or more stabilizers, such as, for example, 2,2,4-trimethyl-1,2-dihydroquinoline polymer (VULKANOX HS/LG), zinc-4-and-5-methyl-2-mercapto-benzimidazole (VULKANOX ZMB2). In a further embodiment, the one or more stabilizers are present in an amount from 0.5 wt % to 10 wt %, or from 1.0 wt % to 8.0 wt %, or from 1.5 wt % to 6.0 wt %, or from 2.0 wt % to 4.0 wt %, based on the weight of the composition.

In one embodiment, or a combination of embodiments described herein, the composition comprises a paraffin oil, like SUNOCO SUNPAR 2280.

In one embodiment, or a combination of embodiments described herein, the composition comprises one or more coagents. In a further embodiment, the one or more coagents are present in an amount from 0.2 wt % to 5.0 wt %, or from 0.4 wt % to 4.5 wt %, or from 0.6 wt % to 4.0 wt %, or from 0.8 wt % to 3.5 wt %, or from 1.0 wt % to 3.0 wt %, based on the weight of the composition.

In one embodiment, or a combination of embodiments described herein, the composition comprises ≥60 wt %, or ≥65 wt %, or ≥70 wt %, or ≥75 wt %, or ≥80 wt %, ≥85 wt %, or ≥90 wt %, or ≥95 wt %, or ≥98 wt %, or ≥99 wt % the sum of component A, component B and component C, and optionally component D, based on weight of the composition.

In one embodiment, or a combination of embodiments described herein, or a combination of embodiments described herein, the composition comprises ≥60 wt %, or ≥65 wt %, or ≥70 wt %, or ≥75 wt %, or ≥80 wt %, ≥85 wt %, or ≥90 wt %, or ≥95 wt %, or ≥98 wt %, or ≥99 wt % the sum of component A, component B and component C, and component D, based on weight of the composition.

In one embodiment, or a combination of embodiments described herein, the composition comprises ≤1.00 wt %, or ≤0.50 wt %, or ≤0.20 wt %, or ≤0.10 wt %, or ≤0.05 wt % of a styrenic block copolymer or terpolymer (for example, an SES, SBS, SEP, etc.), based on the weight of the composition. In one embodiment, the composition does not comprise a styrenic block copolymer or terpolymer (for example, an SES, SBS, SEP, etc.).

In one embodiment, or a combination of embodiments described herein, the composition comprises ≤1.00 wt %, or ≤0.50 wt %, or ≤0.20 wt %, or ≤0.10 wt %, or ≤0.05 wt % of a polystyrene, based on the weight of the composition. In one embodiment, the composition does not comprise a polystyrene.

In one embodiment, or a combination of embodiments described herein, the composition comprises ≤50 wt %, or ≤40 wt %, or ≤30 wt %, or ≤20 wt %, or ≤10 wt % of an EVA, based on the weight of the composition.

In one embodiment, or a combination of embodiments described herein, the composition comprises ≤1.00 wt %, or ≤0.50 wt %, or ≤0.20 wt %, or ≤0.10 wt %, or ≤0.05 wt % of an EVA, based on the weight of the composition. In one embodiment, the composition does not comprise an EVA.

In one embodiment, or a combination of embodiments described herein, the composition comprises ≤1.00 wt %, or ≤0.50 wt %, or ≤0.20 wt %, or ≤0.10 wt %, or ≤0.05 wt % of a polyamide, based on the weight of the composition. In one embodiment, the composition does not comprise a polyamide.

In one embodiment, or a combination of embodiments described herein, the composition comprises ≤1.00 wt %, or ≤0.50 wt %, or ≤0.20 wt %, or ≤0.10 wt %, or ≤0.05 wt % of a polypropylene homopolymer, based on the weight of the composition. In one embodiment, the composition does not comprise a polypropylene homopolymer.

In one embodiment, or a combination of embodiments described herein, the composition comprises ≤25 wt %, or ≤20 wt %, or ≤15 wt %, or ≤10 wt %, or ≤5.0 wt % of a propylene-based copolymer, based on the weight of the composition. In one embodiment, the composition does not comprise a propylene-based copolymer.

In one embodiment, or a combination of embodiments described herein, the composition comprises ≤1.00 wt %, or ≤0.50 wt %, or ≤0.20 wt %, or ≤0.10 wt %, or ≤0.05 wt % of a propylene-based copolymer, based on the weight of the composition. In one embodiment, the composition does not comprise a propylene-based copolymer.

In one embodiment, or a combination of embodiments described herein, the composition comprises ≤25 wt %, or ≤20 wt %, or ≤15 wt %, or ≤10 wt %, or ≤5.0 wt % of a propylene/ethylene copolymer, based on the weight of the composition. In one embodiment, the composition does not comprise a propylene/ethylene copolymer.

In one embodiment, or a combination of embodiments described herein, the composition comprises ≤1.00 wt %, or ≤0.50 wt %, or ≤0.20 wt %, or ≤0.10 wt %, or ≤0.05 wt % of a propylene/ethylene copolymer, based on the weight of the composition. In one embodiment, the composition does not comprise a propylene/ethylene copolymer.

Also provided is a crosslinked composition formed from the composition of any one or more embodiments described herein.

In one embodiment, or a combination of embodiments described herein, the composition has a Tensile Strength ≥4.0 MPa, or ≥4.5 MPa, or ≥5.0 MPa.

In one embodiment, the composition has an Elongation at Break from 100% to 200%.

An inventive composition may comprise a combination of two or more embodiments as described herein.

Also is provided an article comprising at least one component formed from the composition of one or more compositions described herein.

An article may comprise a combination of two or more embodiments as described herein.

A Summary of Some Embodiments a) As discussed above, a composition is provided, comprising the following components:
A) an ethylene/α-olefin/non-conjugated diene interpolymer;
B) a peroxide;
C) at least one multi-vinyl cyclic siloxane selected from Structure 1 below:

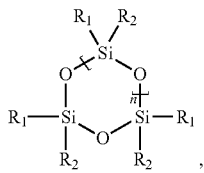

Structure 1 wherein n is an integer greater than, or equal to, 1;

and each R1 is independently selected from the following: a $(C_2-C_4)$alkenyl, or a $H_2C=C(R^{1a})-C(=O)-O-(CH_2)_m-$, and wherein $R^{1a}$ is H or methyl, and m is an integer from 1 to 4; and each R2 is independently selected from the following: H, a $(C_1-C_4)$alkyl, a $(C_2-C_4)$alkenyl, a phenyl, or a $H_2C=C(R^{1b})-C(=O)-O-(CH_2)_m-$, wherein $R^{1b}$ is H or methyl, and m is an integer from 1 to 4.

b) The composition of a) above, wherein the composition further comprises component D selected from a silicone rubber or a silicone oil, and further a silicone rubber comprising one or more vinyl groups or a silicon oil comprising one or more vinyl groups.

c) The composition of a) or b) above, wherein the Structure 1 of component C is selected from Structure 1a below:

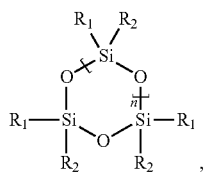

Structure 1a wherein subscript n is an integer greater than, or equal to, 1; each R1 is independently a $(C_2-C_4)$ alkenyl, further a $(C_2-C_3)$ alkenyl, further a $(C_2)$ alkenyl, and each R2 is independently H, a $(C_1-C_4)$ alkyl, a $(C_2-C_4)$alkenyl, or a phenyl, further H or a $(C_1-C_4)$ alkyl, further a $(C_1-C_4)$ alkyl.

d) The composition of any one of a)-c) above, wherein the Structure 1 of component C is selected from Structure 1b below:

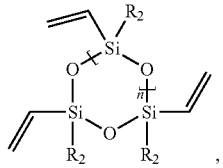

Structure 1b wherein subscript n is an integer greater than, or equal to, 1, and each R2 is independently H, a $(C_1-C_4)$ alkyl, a $(C_2-C_4)$ alkenyl, or a phenyl, further H or a $(C_1-C_4)$ alkyl, further a $(C_1-C_4)$ alkyl.

e) The composition of any one of a)-d) above, wherein the weight ratio of component A to component C is from 10 to 80.

The composition of any one of a)-e) above, wherein component A is present in an amount from 36 wt % to 70 wt %, or from 38 wt % to 68 wt %, or from 40 wt % to 66 wt %, or from 42 wt % to 64 wt %, or from 43 wt % to 63 wt % based on the weight of the composition.

g) The composition of any one of a)-f) above, wherein the ethylene/α-olefin/non-conjugated diene interpolymer of component A is an EPDM.

h) The composition of any one of a)-g) above, wherein the composition comprises ≥90 wt %, or ≥92 wt %, or ≥95 wt %, or ≥98 wt %, or ≥99 wt % of component A, as the only olefin-based polymer present in the composition.

i) The composition of any one of a)-h) above, wherein the weight ratio of component A to component D is from 1.1 to 7.0, or from 1.2 to 6.5, or from 1.3 to 6.0, or from 1.4 to 5.5, or from 1.5 to 5.0.

j) The composition of any one of a)-i) above, wherein the weight ratio of component A to component D is from 1.1 to 5.0, or from 1.2 to 4.5, or from 1.3 to 4.0, or from 1.4 to 3.5, or from 1.5 to 3.0.

k) The composition of any one of a)-j) above, wherein the weight ratio of component A to component D is from 4.0 to 8.0, or from 4.5 to 7.5, or from 5.0 to 7.0, or from 5.5 to 6.5.

l) The composition of any one of a)-k) above, wherein the weight ratio of component A to component C is from 10 to 80, or from 15 to 75, or from 20 to 70.

m) The composition of any one of a)-l) above, wherein the weight ratio of component A to component C is from 20 to 80, or from 25 to 75, or from 30 to 70.

n) The composition of any one of a)-m) above, wherein component C is present in an amount from 0.80 wt % to 4.00 wt %, or from 0.80 wt % to 3.80 wt %, or from 0.80 wt % to 3.60 wt %, or from 0.85 wt % to 3.40 wt %, or from 0.85 wt % to 3.20 wt %, or from 0.90 wt % to 3.10 wt % based on the weight of the composition.

o) The composition of any one of a)-n) above, wherein component A is present in an amount from 36 wt % to 70 wt %, or from 38 wt % to 68 wt %, or from 40 wt % to 66 wt %, or from 42 wt % to 64 wt %, or from 43 wt % to 63 wt % based on the weight of the composition.

p) The composition of any one of a)-o) above, wherein component A has a density from 0.850 to 0.890 g/cc, or from 0.852 to 0.885 g/cc, or from 0.855 to 0.880 g/cc, or from 0.858 to 0.875 g/cc, or from 0.858 to 0.870 g/cc, or from 0.858 to 0.865 g/cc (1 cc=1 $cm^3$).

q) The composition of any one of a)-p) above, wherein component A has a Mooney Viscosity (ML 1+4, 125° C.) from 20 to 60, or from 25 to 55, or from 30 to 50, or from 35 to 45.

r) The composition of any one of a)-q) above, wherein component A has a melt index (I2) from 0.5 to 5.0 g/10 min, or from 1.0 to 4.0 g/10 min, or from 1.0 to 3.0 g/10 min, or from 1.0 to 2.0 g/10 min (190° C. and 2.16 kg).

s) The composition of any one of a)-r) above, wherein the composition further comprises component E selected from ZnO and/or MgO, and further ZnO.

t) The composition of any one of a)-s) above, wherein the weight ratio of component A to component E is from 5.0 to 12, or from 6.0 to 11, or from 7.0 to 10.

u) The composition of any one of a)-t) above, wherein the composition further comprises component F selected from one or more fillers. In a further embodiment, component F is silica or carbon black.

v) The composition of any one of a)-u) above, wherein the weight ratio of component A to component F is from 2.4 to 6.2, or from 2.6 to 6.0, or from 2.8 to 5.8.

w) The composition of any one of a)-v) above, wherein the composition comprises component F in an amount from 5.0 wt % to 60 wt %, or from 10 wt % to 50 wt %, or from 15 wt % to 45 wt %, or from 20 wt % to 40 wt %, or from 25 wt % to 35 wt % based on the weight of the composition.

x) The composition of any one of a)-w) above, wherein the composition comprises ≥90 wt %, or ≥92 wt %, or ≥94 wt %, or ≥96 wt %, or ≥98 wt %, or ≥99 wt % of component A, based on the weight of all olefin-based polymers present in the composition.

y) The composition of any one of a)-x) above, wherein the composition comprises ≥80 wt %, or ≥85 wt %, or ≥90 wt %, or ≥95 wt %, or ≥98 wt %, or ≥99 wt % of component A, based on the weight of all polymers present in the composition.

z) The composition of any one of a)-y) above, wherein the composition comprises ≥60 wt %, or ≥65 wt %, or ≥70 wt %, or ≥75 wt %, or ≥80 wt %, ≥85 wt %, or ≥90 wt %, or ≥95 wt %, or ≥98 wt %, or ≥99 wt % the sum of component A, component B and component C, and optionally component D, based on weight of the composition.

aa) The composition of any one of a)-z) above, wherein the composition comprises ≥60 wt %, or ≥65 wt %, or ≥70 wt %, or ≥75 wt %, or ≥80 wt %, ≥85 wt %, or ≥90 wt %, or ≥95 wt %, or ≥98 wt %, or ≥99 wt % the sum of component A, component B and component C, and component D, based on weight of the composition.

bb) The composition of any one of a)-aa) above, wherein, for Structure C, n is from 1 to 10, or from 1 to 8, or from 1 to 6, or from 1 to 5, or from 1 to 4, or from 1 to 3, or from 1 to 2. In a further embodiment, n=1.

cc) The composition of any one of a)-bb) above, wherein, for Structure C, each R2 is independently H or a ($C_1$-$C_4$) alkyl, and further a ($C_1$-$C_4$) alkyl.

dd) The composition of any one of a)-cc) above, wherein, for Structure C, each R1 is independently a ($C_2$-$C_4$)alkenyl, and further a ($C_2$)alkenyl.

ee) The composition of any one of a)-dd) above, wherein the composition further comprises component D, and component D comprises one or more vinyl groups.

ff) The composition of any one of a)-ee) above, wherein the composition further comprises component D selected from a silicone rubber, and further a silicone rubber comprising one or more vinyl groups.

gg) The composition of any one of a)-ee) above, wherein the composition further comprises component D selected from a silicone oil, and further a silicon oil comprising one or more vinyl groups.

hh) Also is provided, a crosslinked composition formed from composition of any one of a)-gg) above, wherein ii) Also is provided, an article comprising at least one component formed from the composition of any one of a)-hh) above.

Additives

The present composition may include one or more additives. Additives include, but are not limited to, antioxidants, ultraviolet absorbers, antistatic agents, pigments, viscosity modifiers, anti-block agents, release agents, fillers, coefficient of friction (COF) modifiers, induction heating particles, odor modifiers/absorbents, and any combination thereof.

Definitions

Unless stated to the contrary, implicit from the context, or customary in the art, all parts and percents are based on weight, and all test methods are current as of the filing date of this disclosure.

The term "composition," as used herein, includes material(s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, 50 wt % or a majority amount of olefin monomer, for example ethylene or propylene (based on the weight of the polymer), and optionally may comprise one or more comonomer.

The term, "ethylene-based polymer," as used herein, refers to a polymer that comprises 50 wt % or a majority weight percent polymerized ethylene monomer (based on the total weight of the polymer), and optionally may comprise at least one polymerized comonomer.

The term, "ethylene/α-olefin/non-conjugated diene interpolymer," as used herein, refers to an interpolymer that comprises, in polymerized form, an ethylene monomer (based on the weight of the interpolymer), an α-olefin and a non-conjugated diene. In one embodiment, the interpolymer comprises a majority amount of ethylene.

The term "propylene-based copolymer," as used herein, refers to a polymer that comprises, in polymerized form, a majority amount of propylene monomer (based on the total weight of the polymer) and a comonomer, as the only monomer types.

The term "propylene/ethylene copolymer," as used herein, refers to a polymer that comprises, in polymerized form, a majority amount of propylene monomer (based on the total weight of the polymer) and ethylene, as the only monomer types.

As used herein, the term "crosslinking" refers to at least 50 wt %, further at least 60 wt %, of the composition remains insoluble after refluxing in xylene, at a temperature of 140° C. (boiling point of xylene, reflux) for 12 hours. See ASTM D2765.

Test Methods

GPC—Silicone Rubber

The chromatographic equipment consisted of a Waters 2695 Separations Module equipped with a vacuum degasser, and a Waters 2414 refractive index detector. The separation was made with three STYRAGEL HR columns (300 mm×7.8 mm) (molecular weight separation range of 100 to 4,000,000), preceded by a STYRAGEL guard column (30 mm×4.6 mm). The analyses were performed using certified grade toluene, flowing at 1.0 mL/min as the eluent, and the columns and detector were both heated to 45° C. The sample (0.5% wt/v) was prepared by weighing approx. 0.025 g of neat sample into a 12-mL glass vial, and diluting with approx. 5 ml toluene. The sample solution was transferred to a glass autosampler vial, after filtered through 0.45 μm PTFE filter. An injection volume of 100 uL was used, and data was collected for 38 minutes. Data collection and analyses were performed using Waters Empower GPC software. Molecular weight averages were determined relative to a calibration curve (3rd order) created using polystyrene standards covering the molecular weight range of 370-1,270,000 g/mole.

Melt Index

Melt index (or I2, $I_2$ or MI) for an ethylene-based polymer is measured in accordance with ASTM D 1238, Condition 190° C./2.16 kg, and is reported in grams eluted per 10 minutes.

DSC Standard Method

Differential Scanning calorimetry (DSC) is used to measure crystallinity in ethylene-based polymers (PE, or OBC) samples and propylene-based polymer (PP) samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for ethylene-based polymer samples (230° C. for propylene-based polymer samples). The sample is kept at this temperature for three minutes. Then the sample is cooled at a rate of 10° C./min to −60° C. for ethylene-based polymer samples (−40° C. for propylene-based polymer samples), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for ethylene-based polymer samples (165 J/g, for propylene-based polymer samples), and multiplying this quantity by 100 (e.g., for ethylene-based polymer samples, % cryst.=($H_f$/292 J/g)×100; and for propylene-based polymer samples, % cryst.=($H_f$/165 J/g)×100).

Unless otherwise stated, melting point(s) ($T_m$) of each polymer is determined from the second heat curve obtained from DSC, as described above (peak $T_m$). The crystallization temperature ($T_a$) is determined from the first cooling curve (peak $T_c$).

Experimental

Materials

NORDEL IP 3640 EPDM from The DOW Chemical Company, Mooney Viscosity (ML 1+4, 125° C.)=40 (ASTM D1646), and a density=0.86 g/cc (ASTM D 297).

Methyl vinyl silicone rubber (VMQ): XIAMETER RBB-2002-50 from The DOW Chemical Company.

Vinyl terminated silicone oil: viscosity 100 mPa·s at 25° C., vinyl group content from 3.1 to 3.6 mol %, commercially available from Shao Xing Li Jie Hua Gong Corp.

Other additives were listed in Table 1.

TABLE 1

| Additives | | |
|---|---|---|
| Chemicals | Abbrev | CAS No. |
| Trimethylopropane trimethacrylate Coagent | SARET 517 | 3290-92-4 |
| Triallyl isocyanurate Coagent | TAIC | 1025-15-6 |
| N,N'-1,3-Phenylenedimaleimide Coagent | HVA-2 | 3006-93-7 |
| 1,3,5,7-Tetravinyl-1,3,5,7-tetramethylcyclotetrasiloxane Coagent | ViD4 or Vinyl-D4 | 27342-69-4 |
| Precipitated silica | ULTRASIL VN3 | 112926-00-8 |
| Vinyl tris (2 methoxy-ethoxy) silane | SILQUEST A-172NT | 1067-53-4 |
| Zinc oxide | ZNO | 1314-13-2 |
| Polyethylene glycol | CARBOWAX PEG 4000 | 25322-68-3 |
| 2,2,4-Trimethyl-1,2-Dihydroquinoline polymer | VULKANOX HS/LG | 26780-96-1 |
| Zinc-4-and-5-methyl-2-mercaptobenzimidazole | VULKANOX ZMB2 | 61617-00-3 |
| Dicumyl peroxide | DCP | 80-43-3 |
| a,a'-bis(tert-butylperoxy)-diisopropylbenzene | BIBP | 25155-25-3 |

Formulations (Compositions)

Compounding

The EPDM, silicone rubber (or silicone oil), silica, ZnO, peroxide, coagent and other additives were mixed in a HAAKE mixer, for 10 minutes, at 80° C., at a rotor speed of 60 rpm. After mixing, each composition was further compressed at 80° C., for two minutes, and cold pressed under 10 MPa pressure, into an approximate "2 mm thick", uncured sheet.

Compression Molding

Each uncured sheet was further molded into a "150 mm×70 mm×2 mm" sized plaque, and simultaneously vulcanized in a hot compression machine at 180° C., for 10 minutes, under 10 MPa pressure. Testing samples were die cut from the cured plaques, under ASTM D412. The cured specimens were conditioned for at least 24 hours, at room temperature and ambient atmos-phere, before testing. See Tables 2-4 for the compositions and associated properties.

MDR Test

MDR cure properties of each formulation were measured in accordance to ASTM D-5289, using an Alpha Technologies MDR 2000. A 4.5 g sample was cut from the above uncured sheet, and put into the MDR holder. The MDR test was carried out at 180° C., over a period of 30 minutes, at an oscillation frequency of 100 CPM (1.67 Hz), and an oscillation angle of 0.5 degree (7% strain). The minimum torque (ML) and the maximum torque (MH), measured by the MDR, during the testing interval, was reported in dNm. The difference between MH and ML is indicative of the extent of crosslinking, with the greater the difference reflecting a greater extent of crosslinking. The time needed for torque to reach equilibrium was reported in minutes. The time required for the increase of one (ts1) or two (ts2) points, from minimum torque, was recorded in minutes. The ts1 and ts2 values are indicative of the time required for the cross-linking process to begin. A shorter time indicates a faster crosslinking rate. Results are shown in Tables 2-4 below, and the following notation used:

MH (Maximum torque): the highest torque recorded in plateau curve;

MH-ML: the difference between the maximum and the minimum torque, related to the crosslink density of the cured material;

ts2 (Induction time): after attaining minimum torque (ML), during cure phase, as the torque rises, the following are noted:

ts2 is the scorch time for viscosity to rise two units above ML;

tc90 (Optimum Cure Time is the time at which 90% of cure has taken place; and

CRI: Cure Rate Index=100/(tc90-ts2), is a measure of the linear slope of the rising curve.

Heat Aging

Samples were aged at 180° C. for one (24 hours), two (48 hours) and three (72 hours) days, in a hot air oven. The tensile properties were measured as discussed below.

Tensile Test

The tensile properties of the cured test samples and aged test samples were obtained, following ASTM D412 testing (dumbbell shaped test sample). Results are shown in Tables 2-4 below. Three samples were analyzed, and an average reported.

Results

Table 2 lists the compositions, and the cure kinetic data, for Examples 1-3 and Comparative Examples 1-3. In this set of examples, "1.5 phr of a coagent" was used in Example 1 and Comparative Examples 1-3, and "3 phr and 5 phr Vinyl-D4" were used in Examples 2 and 3, respectively. The inventive compositions (Vinyl-D4 as cure coagent) showed similar cure behavior (scorch time, crosslink density, cure rate) as that of Comparative Example 1, which contained SARET 517, and Comparative Example 2, which contained TAIC, each at same loading of 1.5 phr. Comparative Example 3, which contained HVA-2, showed the lowest MH-ML (crosslink density). Increasing the Viny-D4 loading from 1.5 phr to 3 phr and 5 phr, increase the MH-ML (crosslink density), indicating that the Viny-D4 is an effective coagent for peroxide cure of EPDM.

Figure 2:
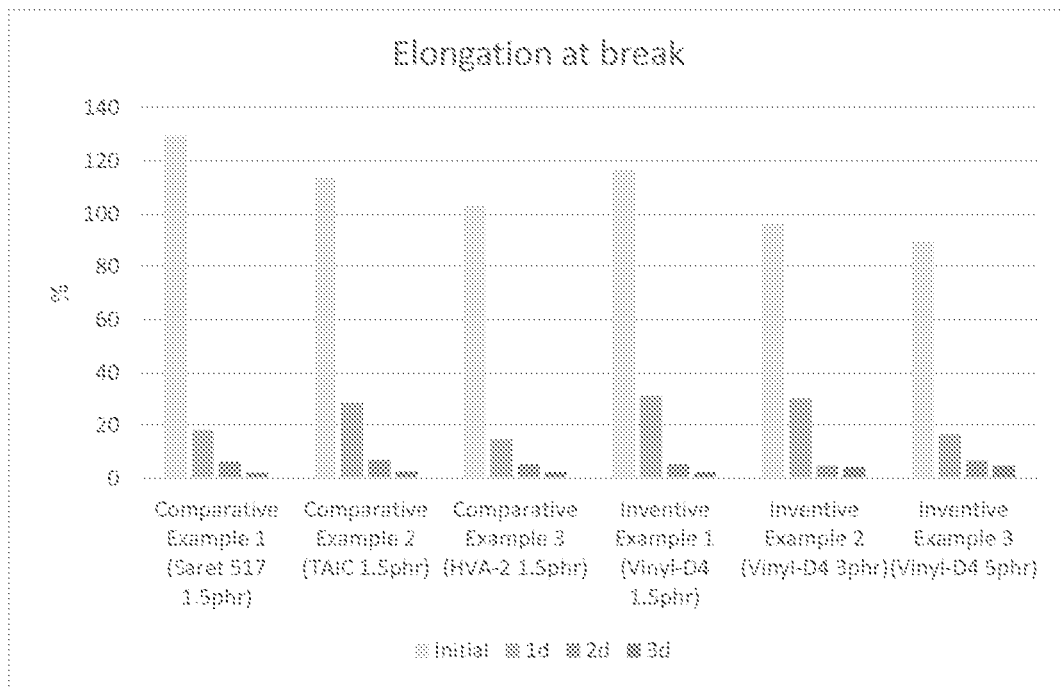
Figure 3:
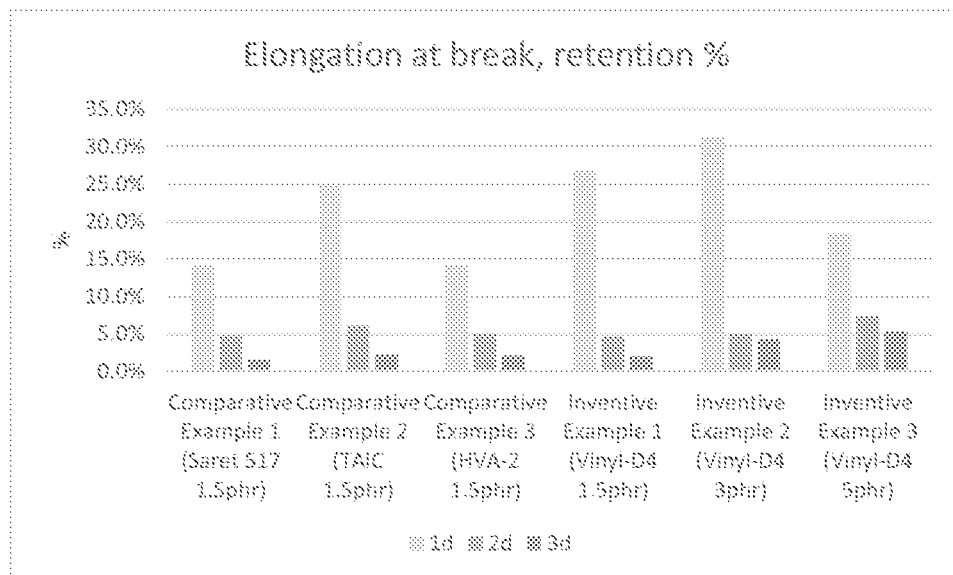

The tensile properties of the initial and heat aged specimens for Examples 1-3 and Comparatives Examples 1-3 are summarized in FIGS. 1-3. The compositions containing the Vinyl-D4 showed slightly lower initial tensile strength (TS), as compared to the compositions containing SARET 517 or TAIC, but similar or higher tensile strength than the composition containing HVA-4. After aging at 180° C., for one day, all compositions showed a decrease in tensile strength, but the compositions containing the Vinyl-D4 show higher tensile strength than the compositions containing SARET 517 or HVA-2, and similar tensile strength to TAIC. The tensile strength increased upon further aging, due to increased stiffness.

The elongation at break (EB) is an important index to evaluate the thermal resistance of cured EPDM compositions. In general, the elongation at break will decrease after heat aging. The higher the amount of retention of the elongation, the better of the thermal resistance of the material. After aging one day at 180° C., the inventive compositions (Vinyl-D4) showed higher retention of elongation than the compositions containing SARET 517 or HVA-2, and slightly higher retention (Examples 1 and 2), than the composition containing TAIC. Increasing the loading of Vinyl-D4 to 3 phr and 5 phr, decreased the initial elongation, due to the increased crosslink density, as show in the MDR data, however using the "3 phr loading" still provided, overall, a higher elongation, after aging, as compared to the composition containing the SARET 517 or the HVA-2.

TABLE 2

Example 1-3 and Comparative Example 1-3 (weight parts)

| | Comp. Ex. 1 | Comp. Ex. 2 | Comp. Ex. 3 | Inv. Ex. 1 | Inv. Ex. 2 | Inv. Ex. 3 |
|---|---|---|---|---|---|---|
| EPDM (NORDEL IP 3640) | 100 | 100 | 100 | 100 | 100 | 100 |
| Silica (VN3) | 35 | 35 | 35 | 35 | 35 | 35 |
| Silane (Silquest A-172NT) | 2 | 2 | 2 | 2 | 2 | 2 |
| ZnO | 10 | 10 | 10 | 10 | 10 | 10 |
| PEG (PEG 4000) | 2 | 2 | 2 | 2 | 2 | 2 |
| Stabilizer (VULKANOX HS/LG 1) | 1 | 1 | 1 | 1 | 1 | 1 |
| Stabilizer (VULKANOX ZMB2) | 1 | 1 | 1 | 1 | 1 | 1 |
| Peroxide (BIBP 40%) | 8 | 8 | 8 | 8 | 8 | 8 |
| Coagent (SARET 517) | 1.5 | | | | | |
| Coagent (TAIC) | | 1.5 | | | | |
| Coagent (HVA-2) | | | 1.5 | | | |
| Coagent (Vinyl-D4) | | | | 1.5 | 3 | 5 |
| Double bond mmol | 13.3 | 18.1 | 11.2 | 17.4 | 34.8 | 58.0 |

TABLE 2-continued

Example 1-3 and Comparative Example 1-3 (weight parts)

|  | Comp. Ex. 1 | Comp. Ex. 2 | Comp. Ex. 3 | Inv. Ex. 1 | Inv. Ex. 2 | Inv. Ex. 3 |
|---|---|---|---|---|---|---|
| ML, dNm | 3.58 | 3.55 | 3.38 | 3.45 | 3.13 | 2.86 |
| MH, dNm | 43.76 | 45.23 | 37.55 | 44.02 | 45.78 | 48.69 |
| MH-ML, dNm | 40.18 | 41.68 | 34.17 | 40.57 | 42.65 | 45.83 |
| ts2, min | 0.33 | 0.36 | 0.26 | 0.35 | 0.36 | 0.37 |
| tc90, min | 4.53 | 4.52 | 4.19 | 4.27 | 4.24 | 4.38 |
| CRI | 23.81 | 24.04 | 25.45 | 25.51 | 25.77 | 24.94 |
| Initial TS (MPa) | 6.41 | 6.55 | 5.37 | 5.82 | 5.35 | 6.13 |
| Initial EB (%) | 129.61 | 113.48 | 103.1 | 116.58 | 96.51 | 89.57 |
| 180° C., 1 day, TS (MPa) | 1.72 | 2.36 | 1.47 | 2.33 | 2.09 | 1.88 |
| 180° C., 1 day, EB (%) | 18.17 | 28.46 | 14.67 | 31.11 | 30.23 | 16.5 |
| 180° C., 1 day, TS (MPa) | 2.49 | 2.78 | 2.92 | 3.06 | 2.87 | 2.82 |
| 180° C., 1 day, EB (%) | 6.20 | 6.97 | 5.20 | 5.33 | 4.78 | 6.62 |
| 180° C., 1 day, TS (MPa) | 3.08 | 4.62 | 4.28 | 3.92 | 4.09 | 4.32 |
| 180° C., 1 day, EB (%) | 2.00 | 2.61 | 2.16 | 2.31 | 4.08 | 4.70 |
| 180° C., 1 day EB retention | 14.0% | 25.1% | 14.2% | 26.7% | 31.3% | 18.4% |
| 180° C., 2 days EB retention | 4.8% | 6.1% | 5.0% | 4.6% | 5.0% | 7.4% |
| 180° C., 3 days EB retention | 1.5% | 2.3% | 2.1% | 2.0% | 4.2% | 5.2% |

Table 3 lists the compositions, and the cure kinetic data, for Inventive Example 4 and Comparative Examples 4-6. See also FIGS. 4-6. In this set of examples, the coagent loadings have an equivalent mole of double bond present in the final composition. The compositions containing the Vinyl-D4 showed a similar scorch time, as the composition containing the SARET 517 or the TAIC, and a higher cure rate (CRI), than the composition containing the SARET 517 or the TAIC. The composition containing the HVA-2 showed the lowest scorch time and the highest cure rate, among the four coagents examined. All four examples showed similar crosslink density.

Figure 4:
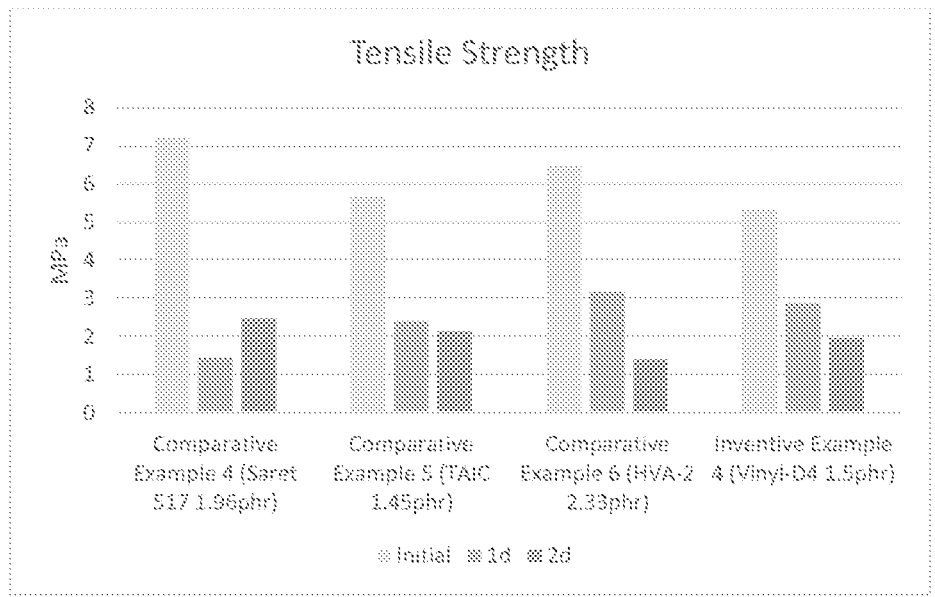
Figure 5:
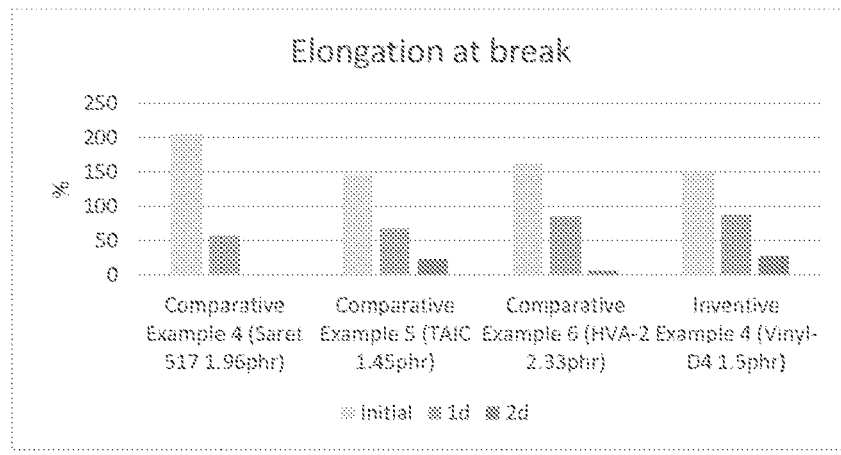
Figure 6:
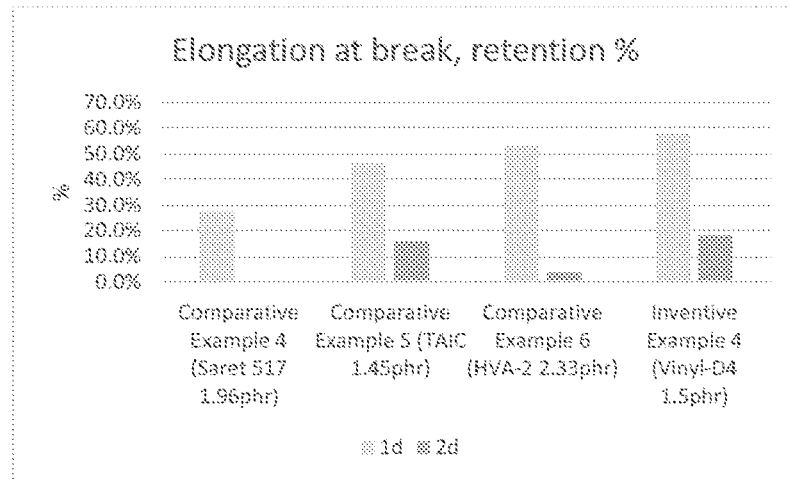

The tensile properties of the initial and heat aged specimens for Example 4 and Comparative Example 4-6 are summarized in FIGS. 4 to 6. The composition containing the Vinyl-D4 showed the highest retention of elongation after heat aging.

TABLE 3

Example 4 and Comparative 4-6 (weight parts)

|  | Comp. Ex. 4 | Comp. Ex. 5 | Comp. Ex. 6 | Inv. Ex. 4 |
|---|---|---|---|---|
| EPDM (NORDEL IP 3640) | 100 | 100 | 100 | 100 |
| Silica (VN3) | 35 | 35 | 35 | 35 |
| Silane (Silquest A-172NT) | 2 | 2 | 2 | 2 |
| ZnO | 10 | 10 | 10 | 10 |
| PEG (PEG 4000) | 2 | 2 | 2 | 2 |
| Stabilizer (VULKANOX HS/LG 1) | 1 | 1 | 1 | 1 |
| Stabilizer (VULKANOX ZMB2) | 1 | 1 | 1 | 1 |
| Peroxide (DCP 40%) | 8 | 8 | 8 | 8 |
| Coagent (SARET 517) | 1.96 |  |  |  |
| Coagent (TAIC) |  | 1.45 |  |  |
| Coagent (HVA-2) |  |  | 2.33 |  |
| Coagent (Vinyl-D4) |  |  |  | 1.50 |
| Double bond mmol | 17.4 | 17.4 | 17.4 | 17.4 |
| ML, dNm | 3.71 | 3.52 | 3.84 | 3.50 |
| MH, dNm | 36.58 | 38.98 | 39.23 | 37.44 |
| MH − ML, dNm | 32.87 | 35.46 | 35.39 | 33.94 |
| ts2, min | 0.30 | 0.32 | 0.25 | 0.33 |
| tc90, min | 2.79 | 2.70 | 2.38 | 2.57 |
| CRI | 40.16 | 42.02 | 46.95 | 44.64 |
| Initial TS (MPa) | 7.18 | 5.65 | 6.44 | 5.33 |
| Initial EB (%) | 205.81 | 146.37 | 163.01 | 151.79 |
| 180° C., 1 day, TS (MPa) | 1.44 | 2.41 | 3.16 | 2.88 |
| 180° C., 1 day, EB (%) | 56.99 | 67.38 | 85.97 | 87.59 |
| 180° C., 2 days, TS (MPa) | 2.48 | 2.14 | 1.41 | 1.96 |
| 180° C., 2 days, EB (%) | 1.14 | 23.52 | 6.08 | 27.44 |
| 180° C., 1 day EB retention | 27.7% | 46.0% | 52.7% | 57.7% |
| 180° C., 2 days EB retention | 0.6% | 16.1% | 3.7% | 18.1% |

Table 4 lists the compositions, and the cure kinetic data, for Examples 5-6 and Comparative Examples 7-9. Comparative Examples 7 and 8 and Inventive Example 5 are blends of EPDM and methyl vinyl silicone rubber (VMQ). Comparative Example 7 contained no curing coagent. Comparative Example 8 contained TAIC as the curing coagent. Example 5 contained Vinyl-D4 as the curing coagent. Comparative Example 9 and Inventive Example 6 are blends of EPDM and a vinyl terminated silicone oil. Comparative Example 9 contained no curing coagent, and Example 6 contained Vinyl-D4 as the curing coagent.

TABLE 4

Example 5-6 and Comparative 7-9 (weight parts)

| | Comp. Ex. 7 | Comp. Ex. 8 | Comp. Ex. 9 | Inv. Ex. 5 | Inv. Ex. 6 |
|---|---|---|---|---|---|
| EPDM (NORDEL IP 3640) | 70 | 70 | 85 | 70 | 85 |
| VMQ (XIAMETER RBB-2002-50) | 40 | 40 | | 40 | |
| Vinyl terminated silicone oil | | | 15 | | 15 |
| Silica (VN3) | 25 | 25 | 35 | 25 | 35 |
| Silane (Silquest A-172NT) | 2 | 2 | 2 | 2 | 2 |
| ZnO | 10 | 10 | 10 | 10 | 10 |
| PEG (PEG 4000) | 2 | 2 | 2 | 2 | 2 |
| Stabilizer (VULKANOX HS/LG 1) | 1 | 1 | 1 | 1 | 1 |
| Stabilizer (VULKANOX ZMB2) | 1 | 1 | 1 | 1 | 1 |
| Peroxide (DCP 40%) | 8 | 8 | 8 | 8 | 8 |
| Coagent (TAIC) | | 1.5 | | | |
| Coagent (Vinyl-D4) | | | | 1.5 | 1.5 |
| ML, dNm | 3.72 | 2.49 | 3.63 | 2.59 | 3.44 |
| MH, dNm | 30.16 | 36.56 | 33.04 | 34.52 | 36.49 |
| MH − ML, dNm | 26.44 | 34.07 | 29.41 | 31.93 | 33.05 |
| ts2, min | 0.32 | 0.30 | 0.33 | 0.31 | 0.31 |
| tc90, min | 2.60 | 2.33 | 2.93 | 2.42 | 2.7 |
| CRI | 43.86 | 49.26 | 38.46 | 47.39 | 41.84 |
| Initial TS (MPa) | 4.33 | 4.63 | 4.81 | 4.43 | 3.63 |
| Initial EB (%) | 170.18 | 136.85 | 160.67 | 136.48 | 109.65 |
| 180° C., 1 day, TS (MPa) | 5.08 | 2.00 | 4.06 | 3.35 | 4.27 |
| 180° C., 1 day, EB (%) | 182.17 | 46.55 | 125.95 | 96.78 | 119.00 |
| 180° C., 2 day, TS (MPa) | 2.00 | 1.82 | 1.50 | 3.78 | 2.92 |
| 180° C., 2 day, EB (%) | 57.82 | 9.66 | 3.18 | 107.45 | 80.27 |
| 180° C., 3 day, TS (MPa) | 1.88 | 3.92 | 3.80 | 3.74 | 2.14 |
| 180° C., 3 day, EB (%) | 15.90 | 4.76 | 2.00 | 101.25 | 54.80 |
| 180° C., 1 day EB retention | 107.0% | 34.0% | 78.4% | 70.9% | 108.5% |
| 180° C., 2 days EB retention | 34.0% | 7.1% | 2.0% | 78.7% | 73.2% |
| 180° C., 3 days EB retention | 9.3% | 3.5% | 1.2% | 74.2% | 50.0% |

Figure 7:
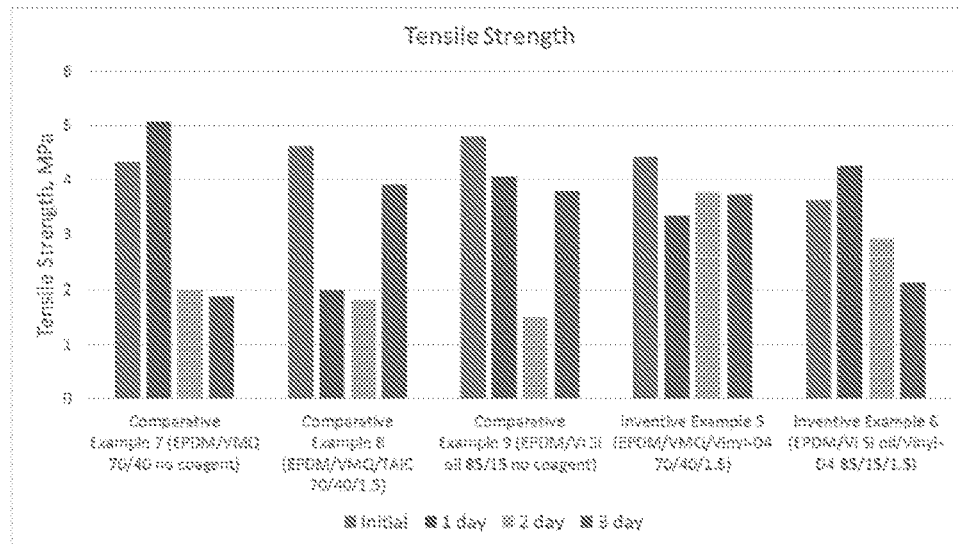
Figure 8:
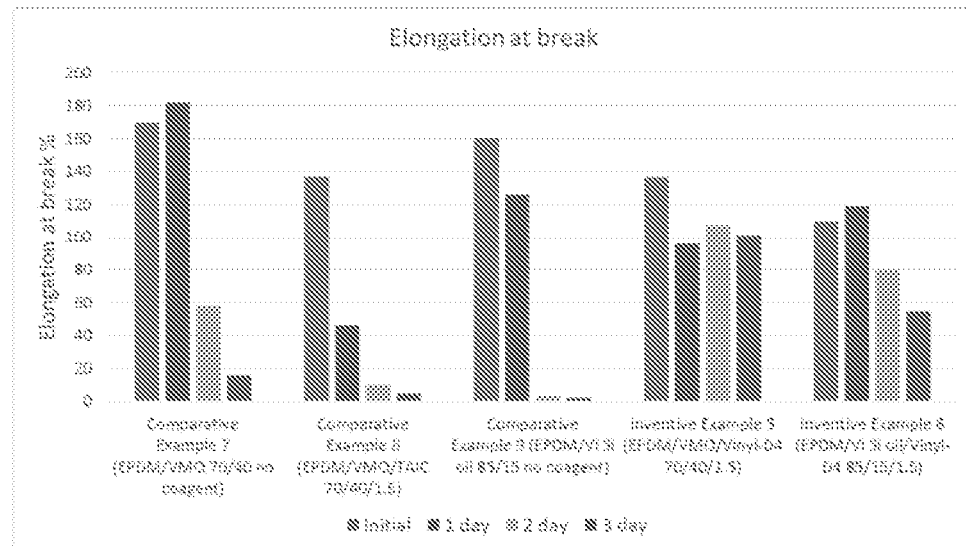
Figure 9:
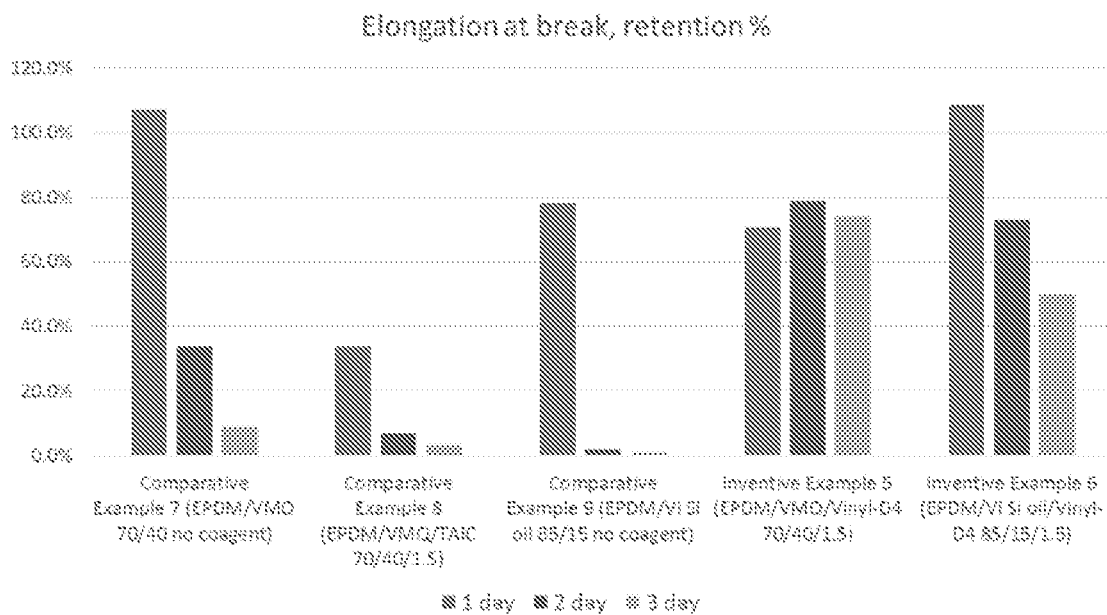

The tensile properties of the initial and heat aged samples for Examples 5-6 and Comparatives Examples 7-9 are summarized in FIG. 7-9. The EPDM/VMQ compositions without coagent, or containing the TAIC as coagent, showed an obvious decrease in tensile strength and elongation after aging. The EPDM/VMQ composition containing the Vinyl-D4 as coagent showed, significantly smaller decrease in tensile strength and elongation. This suggested that the addition of the Vinyl-D4 improved the thermal resistance of the EPDM/VMQ composition. In similar manner, Vinyl-D4 also improved the thermal resistance of EPDM/vinyl silicone oil composition.

Solubility Study

NORDEL IP 3722: ethylene propylene diene terpolymer (EPDM), characterized by a density of 0.87 g/cc (ASTM D297), and a Mooney viscosity (ML 1+4, at 125° C.) of 20 (ASTM D1646), and commercially available from The Dow Chemical Company.

Solubility Test Method

About 1.5-1.6 grams (g) of NORDEL IP 3722 pellets were put into a "25 mL" un-used, transparent glass bottle. TAIC (6 mL) or ViD4 (6 mL) was then added to the bottle, and the resin pellets were suspended in the liquid. The resulted mixture was then sealed, and kept at room temperature (23° C.) for four days, to achieve a full liquid absorption. The pellets were removed from the bottles, and the surface of the pellets were wiped sufficiently, using paper tissue, until no wet spots were observed the used paper. The wiped pellets were then weighed, and the weight recorded. Results are shown in Table 5. As seen in this table, the Inventive Example (ViD4) showed a significant increase in weight, as compared to the Comparative Example (TAIC). This increase in weight indicated a higher amount of the coagent (ViD4) absorbed into the polymer (EPDM) pellets. This higher amount of absorption indicated that the ViD4 coagent had better (improved) solubility within the EPDM than the TAIC coagent. Improved solubility leads to better homogeneous dispersion of the coagent within the EPDM, which should provide better crosslinking density and better physical properties (e.g., tensile and elongation).

TABLE 5

|  | Coagent | Pellets weight before soaking (g) | Pellets weight after soaking (g) | Pellets weight change (g) | Pellets weight change ratio (%) |
|---|---|---|---|---|---|
| Comparative Example | TAIC | 1.5438 | 1.5530 | 0.0092 | 0.60 |
| Inventive Example | ViD4 | 1.5712 | 1.6728 | 0.1016 | 6.47 |

X1 = Pellets weight before soaking;
X2 = Pellets weight after soaking;
X2 − X1 = Pellets weight change;
[(X2 − X1)/X1]*100% = Pellets weight change ratio (%)

What is claimed is:

1. A composition comprising the following components:
A) an ethylene/α-olefin/non-conjugated diene interpolymer;
B) a peroxide;
C) at least one multi-vinyl cyclic siloxane selected from Structure 1 below:

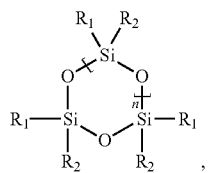

Structure 1 wherein n is an integer greater than, or equal to, 1; and each R1 is independently selected from the following: a (C$_2$-C$_4$) alkenyl, or a H$_2$C=C(R$^{1a}$)—C(=O)—O—(CH$_2$)$_m$—, and wherein R$^{1a}$ is H or methyl, and m is an integer from 1 to 4; and each R2 is independently selected from the following: H, a (C$_1$-C$_4$)alkyl, a (C$_2$-C$_4$)alkenyl, a phenyl, or a H$_2$C=C(R$^{1b}$)—C(=O)—O—(CH$_2$)$_m$—, wherein R$^{1b}$ is H or methyl, and m is an integer from 1 to 4; and
wherein the composition further comprises component D selected from a silicone rubber comprising one or more vinyl groups, or from a silicone oil comprising one or more vinyl groups.

2. The composition of claim 1, wherein the Structure 1 of component C is selected from Structure 1a below:

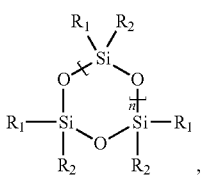

Structure 1a wherein subscript n is an integer greater than, or equal to, 1; each R1 is independently a (C$_2$-C$_4$) alkenyl, and each R2 is independently H, a (C$_1$-C$_4$) alkyl, a (C$_2$-C$_4$)alkenyl, or a phenyl.

3. The composition of claim 1, wherein the Structure 1 of component C is selected from Structure 1b below:

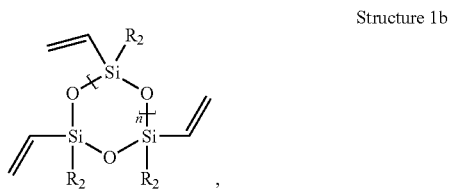

Structure 1b wherein subscript n is an integer greater than, or equal to, 1, and each R2 is independently H, a (C$_1$-C$_4$) alkyl, a (C$_2$-C$_4$) alkenyl, or a phenyl.

4. The composition of claim 1, wherein the weight ratio of component A to component C is from 10 to 80.

5. The composition of claim 1, wherein component A is present in an amount from 36 wt % to 70 wt %, based on the weight of the composition.

6. The composition of claim 1, wherein the ethylene/α-olefin/non-conjugated diene interpolymer of component A is an EPDM.

7. The composition of claim 1, wherein the composition comprises ≥90 wt % of component A, as the only olefin-based polymer present in the composition.

8. A crosslinked composition formed from the composition of claim 1.

9. An article comprising at least one component formed from the composition of claim 1.

10. The composition of claim 1 further comprising component E selected from ZnO and/or MgO.

11. The composition of claim 10, wherein component E is ZnO.

12. A crosslinked composition formed from the composition of claim 10.

13. A crosslinked composition formed from the composition of claim 11.

14. An article comprising at least one component formed from the composition of claim 10.

15. An article comprising at least one component formed from the composition of claim 11.

* * * * *